United States Patent [19]
Pederson

[11] Patent Number: 5,109,304
[45] Date of Patent: Apr. 28, 1992

[54] METHOD OF APPARATUS FOR DETECTING DEFECTS IN DATA APPARATUS SUCH AS MAGNETIC STORAGE APPARATUS

[75] Inventor: Richard J. Pederson, Boulder, Colo.

[73] Assignee: Maxtor Corporation, Longmont, Colo.

[21] Appl. No.: 445,043

[22] Filed: Dec. 4, 1989

[51] Int. Cl.$^5$ ............................................. G11B 5/09
[52] U.S. Cl. ..................................................... 360/51
[58] Field of Search ........................ 360/51, 46, 45, 31

[56] References Cited
U.S. PATENT DOCUMENTS

| | | |
|---|---|---|
| 4,578,721 | 3/1986 | Brannan, Jr. ............................ 360/51 |
| 4,612,586 | 9/1986 | Sordello et al. . |
| 4,682,252 | 7/1987 | Smith . |
| 4,726,022 | 2/1988 | Chan et al. . |
| 4,809,088 | 2/1989 | Lofgren et al. . |

Primary Examiner—Vincent P. Canney
Attorney, Agent, or Firm—Curtis, Morris & Safford

[57] ABSTRACT

A technique is provided for detecting defects in data apparatus, such as magnetic storage apparatus, wherein recovered data pulses are expected during periodic window intervals. Data pulses which may be phase shifted relative to predetermined data pulse times of occurrence are recovered, such as by playing back such pulses from a magnetic storage medium, for example, a hard disk drive. The recovered data pulses are selectively delayed, and the delayed and undelayed data pulses are multiplexed into a stream. The occurrences of such data pulses in the stream within the aforementioned window intervals are detected to provide indications of defects. A defect is indicated if a pulse in the stream does not occur within the window interval.

27 Claims, 3 Drawing Sheets

METHOD OF APPARATUS FOR DETECTING DEFECTS IN DATA APPARATUS SUCH AS MAGNETIC STORAGE APPARATUS

BACKGROUND OF THE INVENTION

This invention relates to techniques for detecting defects in data apparatus and, more particularly, to a method and apparatus for detecting such defects, as may be present in magnetic storage apparatus, for example, in hard disk drives, by sensing whether recovered data pulses occur during predetermined window intervals which, in accordance with the present invention, are margined.

It is desirable to execute diagnostic tests in data processing devices, particularly data storage apparatus such as hard disk drives, to determine whether data retrieval defects may be present. In hard disk drives, a typical defect or error is manifested by a shift in the time of occurrence of a data pulse, or bit, relative to the expected time of occurrence thereof. Although time, or phase, shifting of reproduced data pulses is expected, a bit shifting error which exceeds preset tolerable limits usually is indicative of a defect in the magnetic medium or in the components which are used to record or play back the data pulses. If the bit shift is sufficiently large, data errors will be present during data recovery operations, such as data read operations, which will prevent intelligible data reproduction or recovery.

It has been found that bit shift errors are attributable to one or more of the following defects, which are listed herein merely as examples and not intended to be all-encompassing or limiting: variations in the flatness of the surface of the magnetic medium, variations in the uniformity of the magnetic properties of the magnetic field, variations in the motion or speed of the medium relative to the transducers used therewith, imperfect or poorly compensated peak bit shift compensation, deep magnetization of the magnetic medium, interference from magnetic patterns on adjacent areas or tracks, incomplete erasure or over-writing of prior data, magnetic noise and electrical noise.

Magnetic hard disk storage devices usually are analyzed during the manufacturing/assembly operation, and prior to shipment to a user, to detect the presence of one or more of the aforementioned defects. However, typical analysis equipment, such as that used to measure the bit error rate, is expensive and the test procedures are time-consuming. Moreover, it is possible that some defects escape detection during the testing operation, and others may develop during normal operation of the disk drive. Accordingly, it is desirable to provide on-board diagnostic testing of the disk drive to minimize use of expensive, external equipment and to facilitate testing even after the disk drive is installed in a host data processing device, such as a microcomputer. Indeed, even after data is written into several sectors of the disk(s), additional diagnostic testing before data is written to other sectors is desirable so as to determine which, if any, of those other sectors is defective and should not be used.

In carrying out a write operation with a hard disk drive, data pulses generally are present for recording during predetermined time intervals. Of course, the greater the recording rate, the more closely spaced are the data pulses. A read operation is carried out by generating periodic window intervals synchronized with the clock information recovered from the played back data, and the presence or absence of a data pulse during a window interval determines whether a binary "1" or "0" is recovered. However, the phenomenon of bit shift errors results in the shifting of a reproduced data pulse such that it no longer occurs during the desired center of the aforementioned window. Rather, the recovered data pulse may be shifted toward the leading or trailing edges of the window; and it is expected that such shifting will, in fact, occur and is tolerable, provided that the shifted pulse nevertheless occurs within the window duration. If a recovered data pulse is shifted by an amount whereby it no longer falls within this window, the pulse may be erroneously interpreted, for example, a succeeding binary "0" may be falsely interpreted as a binary "1", giving rise to data errors. Thus, it is important to determine whether a recovered data pulse falls within predetermined window intervals. If not, an error, for example, defects in a hard disk drive, should be noted.

Typical testing of a disk drive serves to detect whether the bit error rate (which may be due, in part, to bit shifting) is within preset limits. If not, the disk drive, or at least certain tracks or sectors, is determined to be defective. Bit error rate generally is a function of the width of the read-detect window. The wider this window, the less likely will bit shifting result in an error. Conversely, it is expected that the bit error rate will increase as the window is narrowed. Thus, during testing, the bit error rate may be ascertained by "shrinking" the window (known as window margining), and detecting the number of bits that occur outside the shrunken window. This is described in more detail in U.S. Pat. No. 4,809,088. A defect is determined if the number of these bit errors per a predetermined number of bits is too large (for example, if there is more than one bit error per $10^{10}$ bits).

U.S. Pat. No. 4,682,252 describes a technique for determining a bit error rate as a function of the size of the window interval used to detect data pulses. Bits whose significant edge, such as the leading and/or trailing edge, falls outside the window are recognized as errors. Window margining is described wherein the effective size, or duration, of the window is shrunk by shifting the recovered data pulses. For example, the trailing edge of a window may be effectively reduced so as to narrow the window interval by delaying the data pulse relative to a fixed window. Such window margining, or relative pulse/window shifting, is achieved by using programmably modifiable monostable multivibrators.

U.S. Pat. No. 4,682,252 refers to U.S. Pat. 4,394,695 in which raw data is used to generate a window of predetermined width at a preset clocking rate. This raw data also is applied to a delay circuit formed of a discrete tapped delay line which functions to delay the data by predetermined amounts relative to the leading edge of the generated window. By selectively delaying the raw data signal, as by deriving that signal from different taps of the delay line, the position of the delayed data pulse relative to the window is varied, thereby effectively margining the data window. Depending upon the delay which is selected, that is, the tap which is chosen, the window may be sufficiently narrowed such that some delayed data pulses occur outside the generated window.

OBJECTS OF THE INVENTION

It is an object of the present invention to provide a simple, accurate, inexpensive arrangement by which data apparatus is subjected to diagnostic testing to determine whether defects are present therein.

Another object of this invention is to provide a technique for detecting defects in a magnetic storage device, such as a magnetic hard disk drive.

It is a further object of this invention to provide an effective window margining arrangement for a defect detector in which the occurrence of a recovered data pulse within a predetermined window interval is sensed.

An additional object of this invention is to provide a defect detector of the aforementioned type wherein the window interval is effectively margined by a variable, desired amount, and a bit error rate is determined by detecting whether a recovered data pulse occurs within the margined window.

Still another object of this invention is to provide a defect detector of the aforementioned type wherein the window interval is margined by shifting, or delaying, recovered data pulses relative to a fixed window.

A still further object of this invention is to provide a defect detector, as aforementioned, in which relatively small delays are imparted to the recovered data pulses, these delays being inherent in cascaded logic circuits, such as logic inverters.

It is still an additional object of this invention to provide a defect detector, as aforementioned, wherein the amount of delay imparted to a recovered data pulse is determined accurately and precisely by a calibrated variable delay circuit.

Various other objects, advantages and features of the present invention will become readily apparent from the ensuing detailed description and the novel features will be particularly pointed out in the appended claims.

SUMMARY OF THE INVENTION

In accordance with this invention, a technique is provided for detecting defects in data apparatus, such as magnetic read/write devices, wherein recovered data pulses, that is, pulses which are read from the magnetic storage device, are expected to occur during periodic window intervals. Data pulses which may be phase shifted relative to predetermined data pulse times of occurrence are recovered, as by reading such data pulses from the magnetic medium. The recovered data pulses are selectively delayed and are multiplexed with undelayed, recovered data pulses into a pulse stream. The non-occurrence of respective data pulses in that stream within the aforementioned window intervals is detected to provide indications of defects in the data apparatus.

As one aspect of this invention, the periodic window intervals are determined by generating periodic window pulses whose centers, at steady state, substantially coincide with the steady state average time of occurrence of the data pulses in the pulse stream.

As yet another aspect of this invention, the pulse stream is produced by alternately selecting the delayed and undelayed data pulses.

In accordance with one feature of this invention, the recovered data pulses are selectively delayed by determining a reference delay period and then selecting a multiple of that reference delay period to establish a desired, predetermined amount of delay for the recovered pulses. Preferably, the aforementioned multiple is a fraction of the reference delay period.

As an aspect of this feature, the reference delay period is determined by supplying reference clock pulses to a number of selectively cascaded logic circuits, such as inverters, each exhibiting an inherent delay, sensing the phase relationship between the delayed and undelayed clock pulses, and changing the number of circuit elements connected in cascade until the delayed and undelayed clock pulses exhibit a desired phase relationship. When that phase relationship is attained, the number of circuit elements connected in cascade establishes the aforementioned reference delay period.

BRIEF DESCRIPTION OF THE DRAWINGS

The following detailed description, given by way of example, and not intended to be limited solely to the embodiment described herein, will best be understood in conjunction with the accompanying drawings in which:

FIGS. 5A-5H are timing diagrams which are useful in understanding the present invention.

DETAILED DESCRIPTION OF A PREFERRED EMBODIMENT

Figures 1, 3, 4:
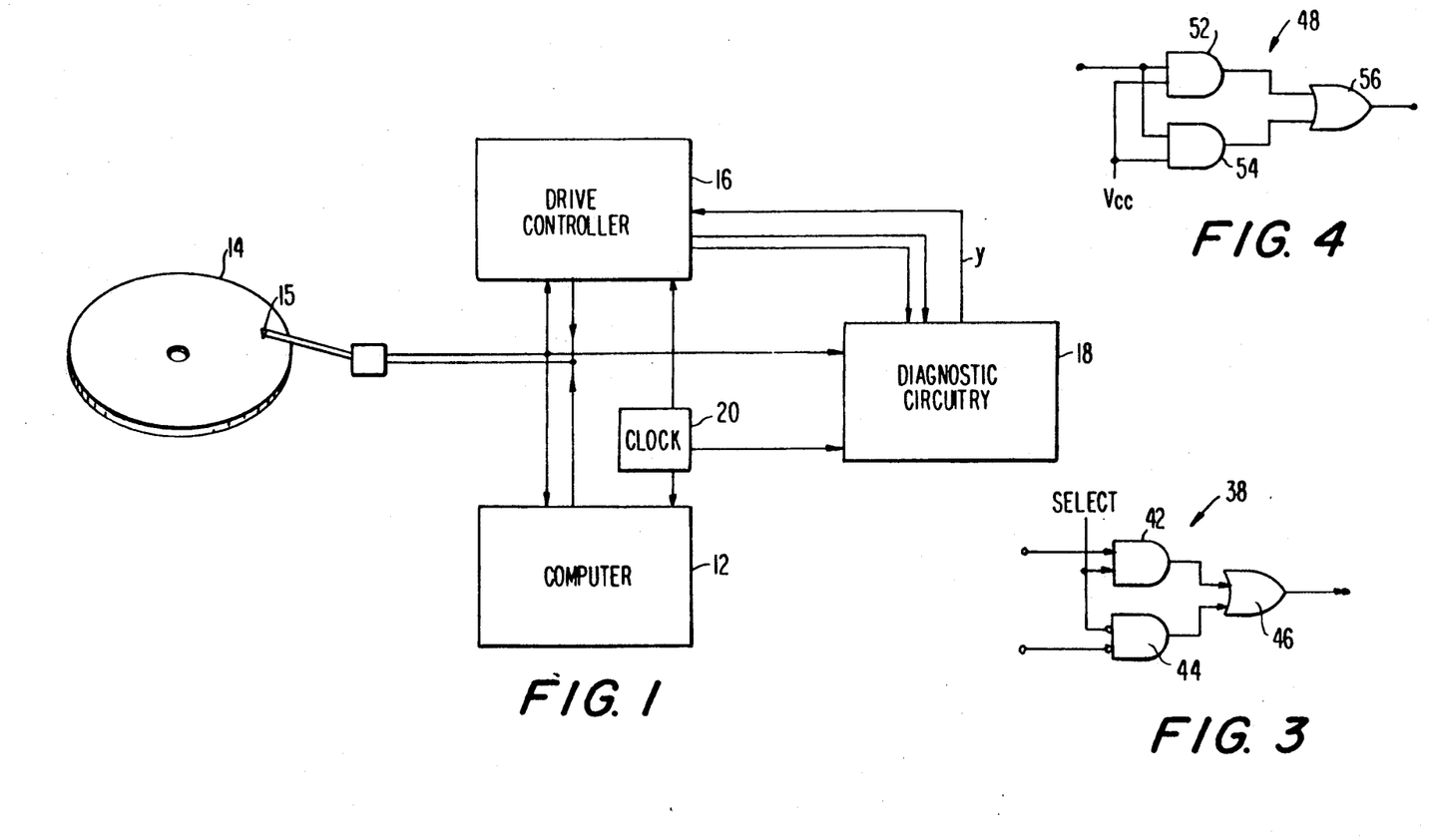
FIG. 1 is a block diagram broadly representing a magnetic disk storage device wherein the present invention finds ready application.
FIG. 3 is a logic diagram of one embodiment of a switch circuit used with the present invention.
FIG. 4 is a logic diagram of a delay compensating circuit used with the present invention.

Referring to FIG. 1, a disk drive is shown in combination with a host data processing device, such as a computer 12, adapted to write data on and read data from one or more magnetic hard disks of the disk drive. For convenience and simplification, only one disk 14 is illustrated in combination with a read/write transducer 15 which is adapted to write digital information in and read that information from sectors in respective tracks on a surface of disk 14 A controller 16 is provided to receive data from computer 12 and write that data onto disk 14. The controller also functions to read data from the disk and supply that read data to the computer. In addition, controller 16 operates to control the rotary speed of disk 14, the positioning of transducer 15 and the proper flow and interfacing of data with respect to computer 12. These functions of controller 16 are well known and, in the interest of brevity, are not described herein.

Controller 16 also is adapted to carry out certain testing of the disk drive apparatus, such as diagnostic testing to determine whether a defect is present. Examples of various defects which may be present have been described above. For the purpose of the present discussion, the most likely defect, that is, the defect which exhibits a statistically greater probability of occurrence, is assumed to be a defect in the magnetic medium. If such a defect is sensed, the sector which contains that defect is excluded from read/write operations or, alternatively, techniques are used to localize that magnetic defect to prevent data from being written or read therefrom while, nevertheless, enabling the remainder of the sector to be used effectively. If several sectors are determined to be defective, an entire track may be disqualified. In any event, the circuitry included in controller 16 which is used to detect such magnetic defects is illustrated in FIG. 1 as diagnostic circuitry 18. It is appreciated that, if desired, this diagnostic circuitry may be separate and apart from controller 16. Whether the diagnostic circuitry is integrally included in the controller or constitutes separate circuit elements forms no part of the present invention per se.

Controller 16 is coupled to transducer 15 to supply data to and recover data from the transducer and, thus, from disk 14. The controller also is coupled to diagnostic circuitry 18 to supply data read from disk 14 to circuitry 18. As will be described, diagnostic circuitry 18 is adapted to detect bit-shift errors which, in accordance with the present invention, are assumed to be indicative of magnetic defects. A defect indication y is returned to controller 16 from diagnostic circuitry 18. In one embodiment, this defect indication is used by controller 16 to determine whether a sector should be precluded from being used.

A clock generator 20 is coupled to controller 16 and to diagnostic circuitry 18 and supplies clock signals for providing proper synchronization and control over the controller and the diagnostic circuitry, as will be described. In one embodiment, clock signals on the order of 33 MHz are supplied to the controller and to the diagnostic circuitry. The clock generator may be adapted to recover clock information from the data that is read from disk 14. Clock generator 20 also is shown as coupled to computer 12 to provide proper synchronization between the computer and the disk drive.

During diagnostic testing, as may be commanded by controller 16, either independently or under the control of computer 12, a predetermined pattern of data pulses is written onto disk 14. In one embodiment, these pulses are written whenever a diagnostic test is carried out; and such pulses are written only into those sectors that do not already store other useful information, as may have been written during a previous data write operation under the control of computer 12. In an alternative embodiment, disk 14 is pre-formatted with a periodic pulse pattern, as during part of the manufacturing/assembly of the disk drive or, alternatively, as part of the initialization, or set-up, operation of the disk drive, as when that drive is installed in computer 12. In any event, the recorded pattern of data pulses is read from disk 14 and supplied, by way of controller 16, to diagnostic circuitry 18. Such data pulses that are recovered from disk 14 are used to synchronize periodic window pulses which exhibit predetermined window intervals. As will be described below, the window generator preferably includes circuitry that is slowly varying such that, during steady state, the window generator does not respond to instantaneous shifts in the recovered data and such instantaneous shifts will not result in a concomitant shift in the window pulse.

In a test mode, diagnostic circuitry 18 imparts a desired delay to selected ones of the recovered data pulses; and the occurrences of the delayed and undelayed data pulses relative to the window pulses is detected. The delayed pulses are equivalent to "shrinking" the window pulse. The amount of delay, or margining of the window, may be as desired for proper determination of the bit error rate. If the delayed (or undelayed) data pulse occurs outside this window, it is assumed that the recovered data pulse has been bit shifted by an amount which exceeds expected bit shifting and is attributable to a magnetic defect. Defect indication y is returned to controller 16 to indicate that a recovered data pulse (or a delayed, recovered data pulse) is not present within the detection window, as may be indicative of a defect.

One or more defect indications y are used by controller 16 to conclude that a sector includes a magnetic defect and to exclude that sector from being used to store data as may be written thereto by computer 12. In the event of severe magnetic defects, controller 16 may preclude a track from being so used. Thus, depending upon the number of defect indications which are tolerable, the controller may by-pass one or more sectors or tracks, or may define a defective area in the sector and prevent that area from being used for data storage.

Figure 2:
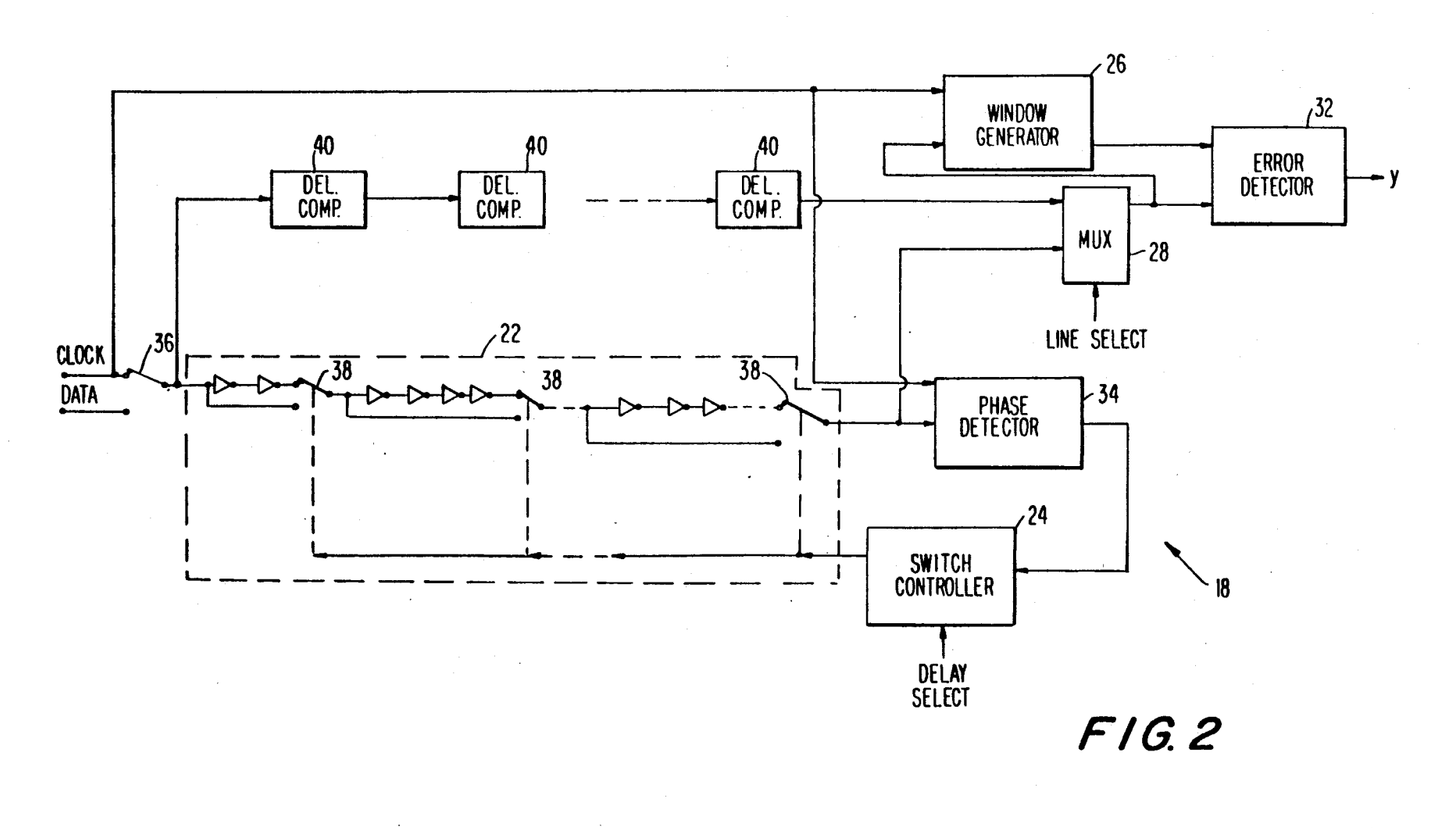
FIG. 2 is a partial block, partial schematic diagram of defect detecting apparatus in accordance with a preferred embodiment of this invention.

Turning now to FIG. 2, there is illustrated a block diagram of the preferred embodiment of diagnostic circuitry 18 which is adapted to detect bit shift errors that are used to indicate defects in the data storage/recovery apparatus of FIG. 1. Diagnostic circuitry 18 is comprised of cascadable delay circuits 22, a window generator 26, a multiplexer 28, an error detector 32 and a phase detector 34. Cascadable delay circuits 22 are formed of n stages of logic inverter units, each logic inverter unit exhibiting an inherent delay which is imparted to a data pulse supplied thereto. The first stage includes two logic inverters, the second stage includes four logic inverters, the third stage includes eight logic inverters, the fourth stage includes sixteen logic inverters, and so on. In general, then, the $i^{th}$ stage includes $2^i$ inverters with i being a number from 1 to n. It is appreciated that the use of an even number of logic inverters in each stage avoids logic inversion of a data bit. A logic inverter unit thus is comprised of two logic inverters.

Each stage of inverters includes a by-pass path in parallel with the delay path and adapted to by-pass the delay otherwise provided by the series-connected inverters in the delay path of that stage. A switch circuit 38 selects either the delayed or undelayed output of a preceding stage for connection to the next-following stage. As will be explained below, switch circuit 38 preferably is comprised of logic gate circuits which are controlled in response to a select signal to select either the delayed or undelayed output from one stage to be passed to the next. Switch circuits 38 are coupled to a switch controller 24 which, in turn, is provided with a digital delay select signal that is decoded and supplied as binary "1" or "0" select signals to respective ones of switch circuits 38. For convenience, a switch circuit is adapted to pass the delayed signal when the binary select signal supplied thereto is a "1" and to pass the undelayed signal when the binary select signal is a "0". Thus, in accordance with typical binary techniques, switch circuits 38 are controlled by the delay select signals supplied to switch controller 24 so as to connect in cascade any desired number of logic inverters from 1 to $2^n$. For example, if the delay select signal is [00011], six inverters are connected in cascade, that is, the delay paths in the first and second stages are selected, whereas the bypass paths in the remaining stages are selected. As another example, if the delay select signal is [10010], thirty-six logic inverters are connected in cascade, with the bypass path of the first stage connected in series with the delay path of the second stage which is connected in series with the bypass paths of the third and fourth stages and the delay path of the fifth stage. Finally, if the delay select signal is [11000], forty-eight logic inverters are connected in cascade with the bypass paths of the first, second and third stages connected in series with the delay paths of the fourth and fifth stages. Other combinations of cascaded logic inverters will be recognized, depending upon the state of the delay select signal. Preferably, this delay select signal is supplied to switch controller 24 by drive controller 16 (shown in FIG. 1).

It is appreciated that the overall delay imparted by the delay circuits is determined by the number of logic inverters which are connected in cascade. The selection of these logic inverters is described below.

The output of delay circuits 22 is connected to one input of multiplexer 28. Another input of this multiplexer is coupled to the input of the delay circuits by way of cascaded delay compensating circuits 40. It will be appreciated that the logic gates which comprise switch circuits 38 exhibit an inherent delay. To compensate for the delays of each of switch circuits 38, delay compensating circuits 40 are connected in series and are formed of substantially the same gate circuit arrangement as switch circuits 38. The number of delay compensating circuits which are connected in cascade is equal to n, the same as the number of switch circuits 38 which are connected in series in delay circuits 22. Thus, it will be seen that if none of the logic inverters is connected in cascade, for example, if the delayed select signal is [00000], the delay imparted by delay circuits 22 is equal to the delay imparted by the cascaded delay compensating circuits 40.

Multiplexer 28 is supplied with a line select signal from drive controller 16. This signal selects either the delayed output from delay circuits 22 or the undelayed output from delay compensating circuits 40. In the preferred embodiment, multiplexer 28 alternately selects the delayed and undelayed data pulses supplied to the respective inputs thereof such that every other output pulse supplied by the multiplexer is a delayed pulse.

The output of multiplexer 28 is coupled to window generator 26 and also to error detector 32. The window generator includes a phase locked loop (PLL) circuit and is additionally supplied with a clock signal generated by, for example, clock generator 20. The clock signal is used to determine the duration of the window; and the PLL circuit functions to shift the center of this window in an attempt to follow, or synchronize with, the delayed and undelayed pulses provided by multiplexer 28. However, as is appreciated, a phase locked loop is a slowly varying device unable to follow instantaneous time shifts in the pulses supplied thereto by the multiplexer. Thus, over a long term, the steady state window pulses produced by window generator 26 are aligned with the average of the times of occurrences of the delayed and undelayed pulses supplied by the multiplexer. This is described in greater detail below in conjunction with the timing waveforms shown in FIG. 5.

The window pulses produced by window generator 26 are supplied to error detector 32. This error detector functions to determine whether a data pulse output supplied thereto by multiplexer 28 falls within a window pulse produced by window generator 26. For example, error detector 32 may include a relatively simple gate circuit to sense the coincidence of the data and window pulses. If a data pulse supplied by multiplexer 28 does not occur within the duration of a window, error detector 32 supplies an error indicating signal y to drive controller 16. In one embodiment, this error signal is indicative of a defect in the data recovery apparatus. In another embodiment, a predetermined number of such error signals accumulated within a preset time or after a preset number of data pulses has been recovered is indicative of a defect.

Delay circuits 22 are operable in two different modes: a delay mode for delaying a recovered data pulse by an amount determined by the number of logic inverters connected in cascade, as mentioned above; and a calibrate mode which effectively measures the amount of delay imparted by a single logic inverter. In the data pulse delay mode, data pulses recovered from disk 14 are supplied to the delay circuits. In the calibrate mode, clock signals, such as generated by clock generator 20, are supplied to the delay circuits. A selector switch 36 is controlled by controller 16 to select either the data pulses or the clock signals to be supplied to delay circuits 22.

When operating in the calibrate mode, phase detector 34 is coupled to the output of delay circuits 22 to receive clock signals delayed thereby; and the phase detector also is coupled to receive the input clock signals directly. Thus, phase detector 34 is supplied with delayed and undelayed clock signals and operates to detect the phase difference therebetween. The output of the phase detector is coupled to switch controller 24 which responds to the in-phase or out-of-phase detection to control the operation of switch circuits 38. The switch controller functions to add logic inverters in cascade until the delayed and undelayed clock signals are substantially in-phase, as detected by phase detector 34. At that time, the total amount of delay imparted to the clock signals by delay circuits 22 is equal to a clock period.

Since the number of logic inverters which are connected in cascade is known, the inherent delay imparted by each logic inverter thus is equal to the clock signal period divided by the number of cascaded logic inverters. It then becomes a simple matter to impart a desired delay to a data pulse simply by cascading the number of logic inverters needed to provide that delay.

The foregoing description of the manner in which delay circuits 22 are selected in the calibrate mode will best be understood from the following numerical example. Let it be assumed that the repetition frequency of clock signals is on the order of 33 MHz. Accordingly, the period between successive clock pulses is on the order of 30 nsec. Initially, switch controller 24 operates to select only one logic inverter unit (i.e. two logic inverters) as the delay element for delay circuits 22. As is expected, phase detector 34 detects that the delayed and undelayed clock signals are not in phase with each other. Consequently, switch controller 24 is supplied with an out-of-phase indication to control switch circuits 38 to connect two logic inverter units (i.e. four logic inverters) in cascade. Once again, the phases of the delayed and undelayed clock signals are detected and, if found to be out-of-phase, the foregoing operation is repeated to connect three logic inverter units (i.e. six logic inverters) in cascade. This successive connection operation continues until a sufficient number of logic inverters are connected in cascade to delay the clock signal by an amount such that it now is in phase with the undelayed clock signal. It is appreciated that the amount of delay needed to attain this in-phase relationship is equal to 30 nsec. If, for example, each logic inverter unit exhibits an inherent time delay on the order of 1 nsec., then thirty logic inverter units (or sixty logic inverters) are cascaded to provide a 30 nsec. delay to bring the delayed clock signal in phase with the undelayed clock signal. Then, a desired delay equal to a fraction of 30 nsec. may be attained by connecting a corresponding fraction of 30 logic inverter units in cascade. For example, if a 10 nsec. delay is desired during diagnostic testing, then 10 logic inverter units (or 20 logic inverters) are connected in cascade as by supplying a delay select signal [01010] to switch controller 24. This delay select signal connects the four logic inverters in the second stage of delay circuits 22 in cascade with the sixteen logic inverters of the fourth stage.

Before describing the manner in which diagnostic circuitry 18 operates to detect defects, reference first is had to the logic circuit diagram of switch circuit 38, as shown in FIG. 3. This switch circuit is comprised of AND gates 42 and 44 having respective inputs connected to the output of the delay path (i.e. the logic inverters) of the preceding stage and the by-pass path of that stage. AND gates 42 and 44 are coupled to OR gate 46 from which a delayed or undelayed output is produced, depending upon whether gate 42 or gate 44 is enabled. A "1" or "0" select signal is supplied as an enable signal directly to gate 42 and, by an inverter, to gate 44. Thus, gate 42 is enabled in response to a "1" while gate 44 is enabled in response to a "0". As a result, OR gate 46 passes a delayed pulse when gate 42 is enabled and an undelayed pulse when gate 44 is enabled.

Delay compensating circuit 40 is shown in FIG. 4 and is seen to be of similar construction as switch circuit 38. Thus, the delay compensating circuit is comprised of AND gates 52 and 54 which are substantially identical to AND gates 42 and 44, as well as an OR gate 56 which is substantially identical to OR gate 46. In view of the similar circuit configurations of delay compensating circuit 40 and switch circuit 38, the inherent delay imparted by each is substantially equal. A clock signal or data pulse is supplied in common to AND gates 52 and 54, depending upon the condition of selector switch 36. These AND gates are enabled by a constant, logic high signal, such as derived from an operating potential $V_{cc}$. OR gate 56 passes the output from either AND gate 52 and 54.

It is appreciated that any delay due to switch circuits 38 is equal to the delay due to delay compensating circuits 40. Multiplexer 28 thus is provided with delayed and undelayed clock signals or data pulses (depending upon the condition of selector switch 36) whose phase difference is determined substantially only by the number of logic inverters cascaded in delay circuits 22.

Figure 5A:
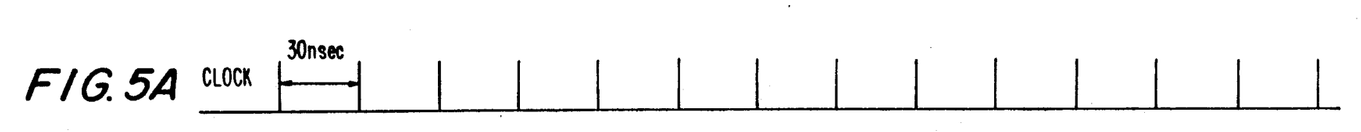
Figure 5B:
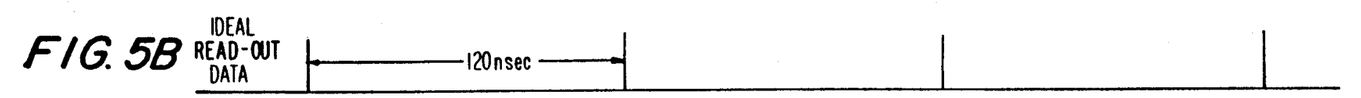
Figure 5C:
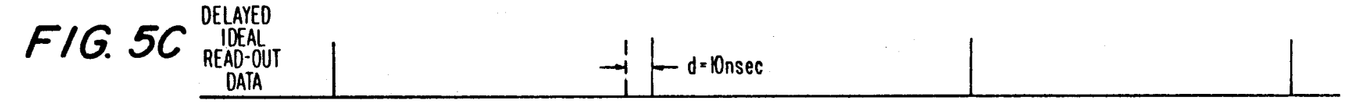

The manner in which the diagnostic circuitry shown in FIG. 2 operates now will be further described in conjunction with the timing diagrams illustrated in FIGS. 5A-5H. It is assumed that the aforementioned calibration operation has been carried out and, thus, the unit delay increment imparted by each delay element (or logic inverter unit) has been determined. It is further assumed that during a defect detecting operation a desired number of delay elements are connected in cascade to impart a time delay represented as d. Assuming that a clock signal on the order of about 33 MHz is generated, as represented by FIG. 5A. In a typical numerical example, data pulses which are recovered from disk 14 are repetitive and, ideally, such recovered data pulses are uniformly spaced apart by 120 nsec., as illustrated in FIG. 5B. Selector switch 36 supplies these recovered data pulses to delay circuits 22 which impart a delay thereto of d, wherein d=10 nsec. FIG. 5C illustrates ideally recovered data pulses delayed by 10 nsec. relative to the undelayed, recovered, ideal data pulses.

Figure 5D:
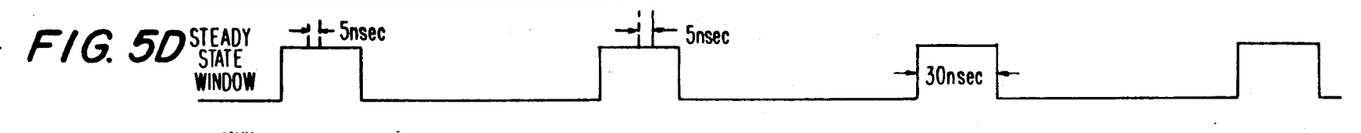

Window generator 26 responds to the clock signal shown in FIG. 5A to generate the window pulses shown in FIG. 5D. As mentioned above, the window generator includes a phase locked loop which is supplied alternately with delayed and undelayed data pulses by multiplexer 28. That is, the multiplexer multiplexes the undelayed data pulses shown in FIG. 5B with the delayed data pulses shown in FIG. 5C to form a stream of data pulses shown in FIG. 5E. As shown, the spacing between successive data pulses varies from 130 nsec. to 110 nsec. because every alternate pulse is a delayed data pulse.

Figure 5E:
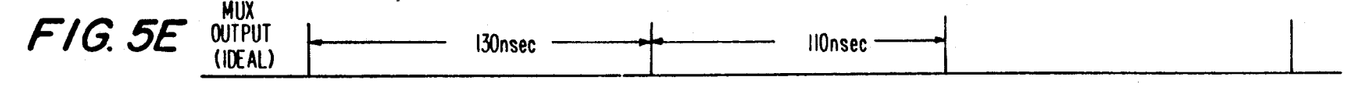

In its attempt to follow this time shifting of the data pulses shown in FIG. 5E, the phase locked loop included in window generator 26 produces window pulses whose centers at steady state substantially coincide with the steady state average time of occurrence of the multiplexed data pulses. Thus, over time, the steady state window pulses generated by window generator 26 appear as shown in FIG. 5D. It is seen that the center of each window pulse is delayed by 5 nsec. relative to each undelayed recovered data pulse and leads by 5 nsec. each delayed data pulse. Nevertheless, by comparing FIGS. 5D and 5E, it is recognized that each pulse included in the stream of multiplexed delayed and undelayed pulses falls within the steady state window. If, ideally, each window pulse is of 30 nsec. duration, the steady state averaged window pulses shown in FIG. 5D are effectively margined. That is, with respect to the undelayed data pulse, the leading edge of the window pulse appears to be reduced by 5 nsec. Similarly, with respect to the delayed data pulse, the trailing edge of each window pulse appears to be advanced by 5 nsec. Thus, by delaying the recovered data pulses and by using the multiplexed stream of delayed and undelayed data pulses to generate the window pulses of FIG. 5D, these window pulses are effectively margined, or "narrowed".

Figure 5F:
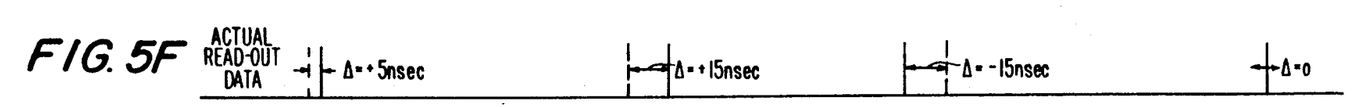

The foregoing has assumed the ideal condition wherein recovered data pulses are uniformly spaced apart. In actual operation, it is expected that, although data pulses are recorded in a uniform pattern, some bit shifting will occur and the recovered data pulses will, nevertheless, be time shifted in both positive and negative directions relative to the ideal case. FIG. 5F illustrates such time-shifted, recovered data pulses and further indicates the time shifting relative to the ideal data pulses shown in FIG. 5B. Thus, as numerical examples, the first actually recovered data pulse is delayed by $\Delta = +5$ nsec. The second actually recovered data pulse is delayed relative to the ideally recovered data pulse by $\Delta = +15$ nsec. The third actually recovered data pulse is time-shifted in the opposite direction as to lead the ideally recovered data pulse. As illustrated in FIG. 5F, the third actually recovered data pulse may be thought of as being delayed by $\Delta = -15$ nsec. Finally, the fourth actually recovered data pulse is assumed to be in phase with the ideally recovered data pulse and $\Delta = 0$.

Figure 5G:
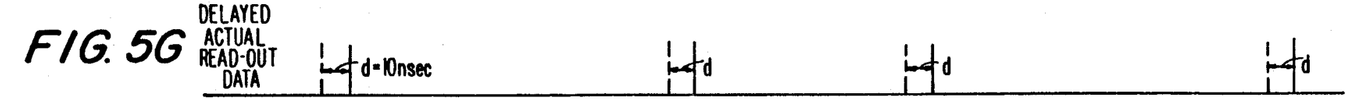

The actually recovered data pulses are supplied by way of delay compensating circuits 40 to multiplexer 28, and such data pulses are those shown in FIG. 5F. These same data pulses also are supplied to delay circuits 22 which impart a delay of d=10 nsec. to each pulse. These delayed pulses also are supplied to multiplexer 28. FIG. 5G illustrates the delayed, actual data pulses relative to the undelayed, actual data pulses.

Figure 5H:
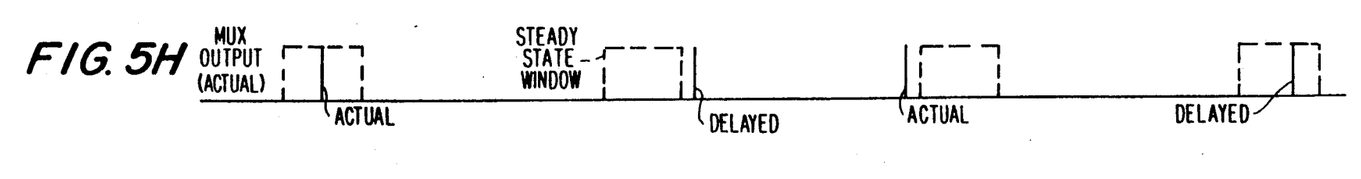

The output of multiplexer 28 is illustrated in FIG. 5H. Desirably, the line select signal applied to the multiplexer alternately selects the delayed and undelayed pulses recovered from disk 14. FIG. 5H also illustrates, in superimposition, the steady state window pulses which are generated by window generator 26 and which have been described above in conjunction with FIG. 5D. These superimposed window pulses are illustrated in FIG. 5H in broken lines.

From FIG. 5H, it is observed that the first data pulse, which is an actually recovered, undelayed data pulse, falls within the window. However, because of the bit shifting phenomenon, the next actually read out data pulse is shifted by an amount which, when added to the delay imparted by delay circuits 22, results in a delayed data pulse that falls outside the window. It is recognized that, if the bit-shifted data pulse shown in FIG. 5F had not been delayed further by delay circuits 22, this bit-shifted data pulse would have occurred within the window. However, by the window margining effect achieved by the present invention, error detector 32 senses that this bit-shifted data pulse falls outside the window and provides an appropriate defect indication.

Similarly, the next bit-shifted actually recovered data pulse is seen to lead by 15 nsec. the ideally recovered data pulse. This leading, bit-shifted data pulse is supplied, undelayed, by multiplexer 28 to error detector 32 which senses that this bit-shifted data pulse falls outside the window. Hence, another defect indication is provided.

While the present invention has been particularly shown and described with reference to a preferred embodiment, various changes and modifications may be made without departing from the spirit and scope of the invention. For example, the numerical examples discussed above simply are illustrative and are not intended to limit the present invention solely thereto. Advantageously, the repetition rate, or spacing, of the window pulses is a function of the pulse pattern that is recorded for diagnostic testing. Alternatively, the window pulses need merely be synchronized with a clock signal which, in turn, is used to record data pulses for diagnostic tests. Furthermore, a greater or lesser number of window pulses may be generated than there are data pulses. In that event, a defect indication may be provided only after a predetermined number of non-coincidence occurrences between recovered data pulses and pulse windows are detected. Furthermore, a defect, such as a magnetic disk defect, may be indicated either when a single non-coincidence occurrence is detected or, alternatively, after a predetermined number of such non-coincidence occurrences have been accumulated. It is intended that the appended claims be interpreted as including the embodiment described herein, the aforementioned alternatives and other equivalents thereto.

What is claimed is:

1. A method of detecting defects in data apparatus wherein recovered data pulses are expected to occur during periodic window intervals, comprising the steps of:
    recovering said data pulses which may be phase shifted relative to predetermined data pulse times of occurrence;
    selectively delaying the recovered data pulses by a determined amount;
    multiplexing undelayed recovered data pulses and delayed data pulses to form a stream of data pulses; and
    detecting if respective data pulses in said stream do not occur within said window intervals to provide defect indications.

2. The method of claim 1 wherein said data pulses are recorded on a magnetic storage medium and the step of recovering said data pulses comprises reproducing data pulses from said magnetic storage medium.

3. The method of claim 1 further comprising the step of generating periodic window pulses having time durations equal to said window intervals, the centers of said window pulses at steady state substantially coinciding with the steady state average time of occurrence of the data pulses in said stream.

4. The method of claim 1 wherein the step of multiplexing comprises alternately selecting delayed and undelayed data pulses to form said stream.

5. A method of detecting defects in data apparatus wherein recovered data pulses are expected to occur during periodic window intervals, comprising the steps of:
    recovering said data pulses which may be phase shifted relative to predetermined data pulse times of occurrence;
    selectively delaying the recovered data pulses by determining a reference delay period and selecting a multiple of said reference delay period to establish a predetermined amount of delay;
    multiplexing undelayed recovered data pulses and delayed data pulses to form a stream of data pulses; and
    detecting if respective data pulses in said stream do not occur within said window intervals to provide defect indications.

6. The method of claim 5 wherein said multiple is a fraction of said reference delay period.

7. The method of claim 5 wherein the step of determining a reference delay period comprises supplying reference clock pulses to a number of selectively cascaded circuit elements, each exhibiting an inherent delay; sensing the phase relationship between the reference clock pulses and clock pulses delayed by the cascaded circuit elements; and changing the number of circuit elements connected in cascade until the reference and delayed clock pulses are in a desired phase relationship, thereby establishing said reference delay period.

8. The method of claim 7 wherein the step of selecting a multiple of said reference delay period comprises selecting a desired fraction of the number of circuit elements that are connected in cascade to establish said predetermined amount of delay.

9. A method for detecting defects of a magnetic storage medium, in which a selectable number of delay elements receives input data pulses, said method comprising the steps:
    determining the number of delay elements needed to establish a reference delay time;
    selecting a subset of said number of delay elements for generating a desired delay time;
    recovering said input data pulses from said magnetic storage medium and supplying the recovered data pulses to said subset of delay elements to output delayed data pulses;
    multiplexing delayed data pulses and undelayed, recovered data pulses to generate a stream of pulses;
    generating window signals occurring at expected pulse detection times; and sensing noncoincidence of a pulse in said stream and a window signal to detect a defect.

10. The method of claim 9, further comprising the step of synchronizing the window signals to the time average of the multiplexed pulses.

11. The method of claim 9 in which the step of determining the number of delay elements needed to establish a reference delay time includes: generating a clock signal, passing said clock signal through a selected number of delay elements to produce a delayed clock signal, phase comparing the delayed and undelayed clock signals, and adjusting the number of delay elements selected until the clock signal is delayed by a full clock cycle delay.

12. The method of claim 9 wherein the step of multiplexing comprises alternately selecting a delayed data pulse and an undelayed data pulse so that the stream of pulses has a delayed pulse as every other pulse.

13. Diagnostic apparatus for detecting defects of a magnetic storage medium on which data pulses are stored, comprising:
a selectable number of delay elements;
means for determining the number of delay elements needed to establish a reference delay time;
means for selecting a subset of said number of delay elements for generating a desired delay time;
means for recovering said data pulses from said magnetic medium and supplying the recovered data pulses to said subset of delay elements for outputting delayed data pulses;
multiplex means for multiplexing delayed data pulses and undelayed, recovered data pulses to generate a stream of pulses;
window generating means for generating window signals occurring at expected pulse detection times; and
error detecting means receiving said window signals and said stream of pulses, for detecting a pulse in said stream during a window signal period, wherein a failure to detect a pulse during said window signal period indicates a defect.

14. The apparatus of claim 13, further comprising means for synchronizing the window generating means with the time average of the multiplexed pulses.

15. The apparatus of claim 13 wherein the selectable number of delay elements includes n cascadable stages of inverter circuits and wherein the $i^{th}$ stage has $2^i$ inverters, i being a number from 1 to n and n being the number of stages.

16. The apparatus of claim 13 wherein the selectable number of delay elements includes cascadable stages of delay elements, each stage comprising a first path having at least one delay element and a second bypass path, and path selecting means for selecting the first path or second path.

17. The apparatus of claim 16 further comprising delay compensating means for compensating an inherent delay of said path selecting means to supply recovered data pulses to said multiplex means.

18. The apparatus of claim 13 wherein the means for determining the number of delay elements needed to establish a reference delay time comprises clock means for generating a clock signal;
means for passing said clock signal through a selected number of delay elements to produce a delayed clock signal;
means for detecting a phase difference between delayed and undelayed clock signals;
and means for altering the number of delay elements selected until the detected phase difference is substantially zero.

19. The apparatus of claim 13 wherein the multiplexing means operates to alternately select delayed and undelayed data pulses, wherein every second pulse is a delayed data pulse.

20. Apparatus for detecting defects in data apparatus wherein recovered data pulses are expected to occur during periodic window intervals, comprising:
means for recovering said data pulses which may be phase shifted relative to predetermined data pulse times of occurrence;
delay means for selectively delaying the recovered data pulses by a determined amount;
multiplex means for multiplexing undelayed recovered data pulses and delayed data pulses to form a stream of data pulses; and
detecting means coupled to said multiplex means for detecting if respective data pulses in said stream do not occur within said window intervals to provide defect indications.

21. The apparatus of claim 20 wherein said data pulses are recorded on a magnetic storage medium and said means for recovering said data pulses comprises read means for reproducing data pulses from said magnetic storage medium.

22. The apparatus of claim 20 further comprising window generating means for generating periodic window pulses having time durations equal to said window intervals and having centers which, at steady state, substantially coincide with the steady state average time of occurrence of the data pulses in said stream.

23. The apparatus of claim 20 wherein said multiplex means is operative to alternately select delayed and undelayed data pulses to form said stream.

24. Apparatus for detecting defects in data apparatus wherein recovered data pulses are expected to occur during periodic window intervals, comprising:
means for recovering said data pulses which may be phase shifted relative to predetermined data pulse times of occurrence;
delay means for selectively delaying the recovered data pulses by a determined amount and including means for determining a reference delay period and selecting means for selecting a multiple of said reference delay period to establish a predetermined amount of delay;
multiplex means for multiplexing undelayed recovered data pulses and delayed data pulses to form a stream of data pulses; and
detecting means coupled to said multiplex means for detecting if respective data pulses in said stream do not occur within said window intervals to provide defect indications.

25. The apparatus of claim 24 wherein said multiple is a fraction of said reference delay period.

26. The apparatus of claim 24 wherein said means for determining a reference delay period comprises a selectable number of circuit elements connected in cascade, each circuit element exhibiting an inherent delay; clock means for supplying reference clock pulses to said number of cascaded circuit elements; phase sensing means for sensing the phase relationship between the reference clock pulses and clock pulses delayed by the cascaded circuit elements; and switch means for changing the number of circuit elements connected in cascade until the reference and delayed clock pulses are in a desired phase relationship, thereby establishing said reference delay period.

27. The apparatus of claim 26 wherein said selecting means comprises means for selecting a desired fraction of the number of circuit elements that are connected in cascade to establish said predetermined amount of delay.

* * * * *